Nov. 5, 1963 W. A. MAXWELL 3,109,797
TUBULAR FUEL ELEMENTS AND FABRICATING TECHNIQUES THEREFOR
Filed Oct. 1, 1957
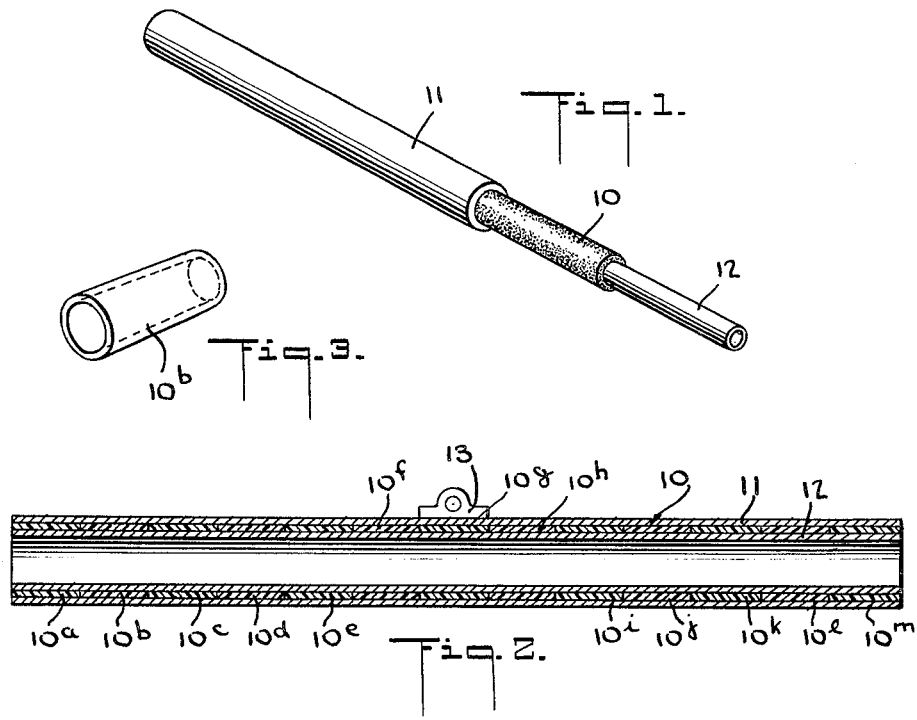
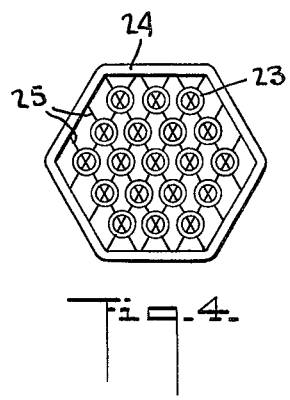
INVENTOR.
WILLIAM A. MAXWELL
BY Benjamin G. Weil
ATTORNEYS United States Patent Office 3,109,797
Patented Nov. 5, 1963

3,109,797
TUBULAR FUEL ELEMENTS AND FABRICATING
TECHNIQUES THEREFOR
William A. Maxwell, Towson, Md., assignor to Martin-
Marietta Corporation, a corporation of Maryland
Filed Oct. 1, 1957, Ser. No. 687,400
4 Claims. (Cl. 204—154.2)

The present invention relates generally to solid fuel elements for nuclear reactors, and more particularly to fuel elements of tubular or hollow configuration.

A nuclear reactor is essentially a furnace incorporating an active core in which nuclear fission occurs, most of the energy being released as heat. A coolant is circulated through the core and the heat is given up in a heat exchanger. The power attainable in a reactor depends largely upon the type and the design of the nuclear fuel elements which make up the core.

In the copending application of Tibor F. Nagey, Jack A. Hunter and William A. Maxwell, entitled "Transportable Nuclear Reactor Power Plant," Ser. No. 684,501, filed Sept. 17, 1957, now abandoned, there is disclosed a nuclear reactor which is adapted to incorporate the tubular fuel element which is the subject matter of the present invention.

Ideally, the fuel element should possess good radiation stability and be able to withstand high temperatures. Its construction should be such as to provide the largest possible heat transfer area to facilitate the removal of heat generated therein. In addition, it should be relatively easy and inexpensive to fabricate. In the design of fuel elements for portable packaged power stations, lightness of weight as well as structural strength and rigidity with a minimum of extraneous supports are also major considerations.

Heretofore the so-called plate design has generally been used in fuel elements for water-moderated reactors. Such fuel elements consist of a set of long plates containing fissionable material, the plates having thin claddings on both sides resulting in a sandwich type structure. The plates may be flat or slightly curved and are held in spaced relation in a box-like metal frame to form a composite fuel element.

The construction of composite fuel elements of the flat plate type has been found to lack structural strength and rigidity. In practice, differential pressures developed between adjacent flow channels defined by the spaced plates will in some instances cause the plates to buckle and touch. Furthermore, the side plates forming the supporting frame not only occupy valuable space and absorb and waste neutrons but also act to increase the metal to water ratio, thereby reducing the efficiency of the device.

In view of the foregoing, it is the principal object of the present invention to provide a fuel element of tubular geometry, characterized by improved structural strength and rigidity. A significant advantage of the tubular construction is that it lends itself to the flow of a cooling medium both inside and outside of the tube, thus affording an increased heat transfer surface.

More particularly, it is an object of the invention to provide a tubular fuel element constituted by a hollow core clad by inner and outer tubes, wherein the fuel loading may be graduated from point to point along the length of the element, thereby improving the flux distribution within the reactor. In accordance with a feature of the invention, the percentage of fissionable material in the core is made to increase progressively along the length of the element from the center to provide the highest concentration at the ends thereof and thereby produce "flux flattening' or better power distribution in the core.

It is a further object of the invention to provide a tubular fuel element constituted by a tubular core of fissionable material having inactive or "dead" end portions acting effectively to seal the element.

Still another object of the invention is to provide a tubular fuel element in which the formation of hot spots at the points of attachment is avoided and wherein extraneous supports are not required within the active or effective core volume.

Another object of the invention is to provide tubular fuel elements having a lower metal-to-water ratio than is attainable in flat plate elements. Tubular elements in accordance with the invention may be securely joined to each other without the use of side plates. Because of the inherent strength of the tubular form, side plates are not required for rigidity.

Also an object of the invention is to provide a technique whereby tubular fuel elements may be readily and economically fabricated.

For a better understanding of the invention, as well as other objects and further features thereof, reference is had to the following detailed description to be read in connection with the accompanying drawing wherein:

FIG. 1 is a perspective view of one preferred embodiment of a tubular fuel element in accordance with the invention.

FIG. 2 is a longitudinal section of the fuel element.

FIG. 3 shows in perspective one of the collars forming the core.

FIG. 4 is an end view of a bundle of tubular fuel elements.

Referring now to the drawing, and more particularly to FIG. 1, a tubular fuel element in accordance with the invention comprises a tubular core 10 including fissionable particles contained in a matrix, the core being surrounded by an outer cladding tube 11 whose interior face is bonded to the exterior surface of the core. Disposed concentrically within the core is an inner cladding tube 12 whose exterior face is bonded to the interior surface of the core.

Core 10 is constituted by a fuel mixture which may, for example, be composed of uranium oxide in a matrix of stainless steel powder or of uranium oxide in a matrix of aluminum, zirconium, titanium or niobium powder. The cladding tubes, which act to preclude attack of the fuel by the coolant and to prevent escape of radioactive fission products, may be formed of standard aluminum tubing, stainless steel tubing or other corrosion-resistant metals. The metal forming the cladding is preferably the same as the metal constituting the matrix of the core to ensure effective bonding therebetween.

The preferred techniques by which the tubular fuel element may be fabricated will now be described. As shown in FIG. 2, the core 10 is made up of a series of axially aligned collars 10a to 10m of like dimension. The individual collars are prepared by mixing a matrix alloy such as stainless steel in powdered form with uranium oxide of proper particle size, the mixture then being pressed and sintered by powder metallurgy techniques to form a collar of convenient length and diameter.

Homogeneity of mixing is essential to successful powder metallurgy. This is controlled largely by the particle size and size distribution of the powders and by the duration of mixing. Pressing or compacting may be carried out at room temperature by means of a hydraulic press, the mixture being placed in a tool steel die having a central rod to determine the inside diameter of the pressed core. The compacted core is then placed in a sintering furnace, preferably of the electrical resistance type, the sintering acting to bond the adjacent surfaces of the particles in the green compact.

In assembling the fuel element, the collars 10a to 10m are inserted over the inner cladding tube 12, and the outer cladding tube 11 is then slipped over the stack of cores. The outer diameter of the inner tube is made to correspond substantially to the inner diameter of the core collars, and the inner diameter of the outer tube 11 is made to correspond substantially to the outer diameter of the collars so that the parts may be assembled without difficulty.

To effect a bond between the interfacial boundaries of the core collars and cladding tubes, cold or hot drawing techniques may be used, or swaging or similar operations employed to reduce or enlarge the diameter of the tubes to create a mechanical or metallurgical bond between the core and the cladding tubes. Good contact between the fuel and the cladding is important in order to keep thermal resistance to a minimum.

In the drawing process, the bonding action is obtained by pulling the tube through an orifice in a die, thus reducing the outside diameter while a mandrel inside the tube controls the inside diameter. In swaging, the tube is passed between cooperating dies which periodically apply radial blows to the surface of the tube to effect a uniform reduction in diameter.

The collars may be fabricated with different percentages of uranium dioxide or other nuclear fuel particles relative to the matrix powder so as to vary the fuel loading from point to point along the length of the element and thereby provide better flux distribution within the reactor. At the ends of the fuel element, dead collars may be provided containing no active fuel, thereby sealing the element. Thus in practice, collars 10a and 10m may be "dead" elements, whereas collars 10b to 10f and 10l to 10h may contain progressively smaller percentages of active fuel. However, to prevent hot spots at the point of attachment, such as is represented by mounting fixture 13 secured to the element, the collar 10g at the fixture position is preferably a non-fuel containing type.

The core may also be prepared by forming a slug or billet of a mixture of matrix alloy and fuel particles by the powder metallugry technique described above and extruding the billet through a suitable die to form an elongated tube. The billet may also be prepared by alloying the uranium oxide material or other forms of nuclear fuel with a suitable matrix material by a melting operation. The billet is then heated to plasticity in a furnace and extruded. In the extrusion process, a billet of solid metal is converted into a continuous length of uniform cross-section by forcing it to flow under high pressure through a die orifice which is so shaped as to impart a given profile to the end product.

Extrusion presses of standard design comprise a container having a longitudinal bore for accommodating the billet, the billet being driven toward the die by a hydraulically or mechanically operated ram. Smooth working of the extrusion process requires the supply to the press of billets which are heated throughout to a uniform plasticity. In the case of the stainless steel mixture, plasticity of the billet is obtainable in a temperature range of 1,700 to 1,900 degrees Fahrenheit, and in the case of aluminum mixture in the range of 900 to 1,000 degrees Fahrenheit.

Another method for preparing the core would consist of preparing a mixture of the constituent powders, for instance, aluminum and uranium oxide. This powder mixture is then blended into a slurry with water and a suitable organic binder such as methyl cellulose or a derivative thereof by conventional ceramic practices. The slurry so produced can then be extruded through a die under pressure to form a hollow tube. This "green" tube is then dried and sintered to produce a cermet tube which, if necessary, may be drawn to the proper dimensions and density. In the case of the aluminum and uranium oxide mixture, the sintering cycle consists of heating the tube for one-half hour at 1000° F. in an atmosphere of a neutral gas such as hydrogen or in a vacuum.

The long tube of core material produced by the press may thereafter be cut to the desired length of the fuel element and clad with thin inner and outer tubes. To vary the fuel loading, several tubes may be made by the extrusion process, each having a different fuel content. These tubes may be cut into sections of suitable length, and the sections assembled into a core tube in the manner described previously in connection with FIG. 2.

Tubular elements may be arranged in bundles, several bundles being grouped together to complete the core. The number of tubes per bundle and the number of bundles per core are dependent upon individual core specifications. The tubes may be rigidly supported at their ends and so held together as to provide the desired spacing therebetween, whereby the flow of coolant is distributed evenly between the inner and outer tube surfaces. Because of the inherent rigidity of the tubular design, a grid at the top and bottom is all that is necessary to support the core in the reactor. No extraneous supports within the active area are needed.

Thus, as shown in FIG. 4, a group of nineteen individual tubular fuel elements 23 are joined together in equispaced relation in a bundle, the tubes being arranged in a hexagonal configuration. At either end of the bundle a hexagonal ring 24 is provided. Four slots are cut in the ends of each tube, the slots being diametrically opposed and 60° apart. A grid 25 of wires is laced through the slots, the ends of the wires being connected to the ring. The wires are brazed to the walls of the tubes at the slot points, thereby maintaining the tube in position within the ring.

While there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A tubular fuel element comprising a plurality of cermet collars consisting of a matrix metal and differing percentages of a powderous oxide of a fissionable metal dispersed in said matrix metal, said matrix metal being selected from the group consisting of stainless steel, aluminum, zirconium, titanium and niobium, said collars being arranged to form an integral tubular core so that the concentration of said oxide is incrementally increased from the center of the core to both ends thereof, and a conformable metal casing metallurgically bonded to said core.

2. The tubular fuel element of claim 1 wherein said matrix metal and said metal casing are of aluminum, and said oxide is uranium dioxide.

3. The tubular fuel element of claim 2 wherein said matrix metal and said metal casing are of stainless steel, and said oxide is uranium dioxide.

4. A nuclear fuel element comprising a cermet tubular core consisting of a powderous fissionable metal oxide distributed in a metal matrix, said metal matrix being selected from the group consisting of stainless steel, aluminum, zirconium, titanium and niobium, inner and outer metal casings metallurgically bonded to the inner and outer surfaces of said core, said core being constituted by a plurality of collars of differing oxide concentration, said collars being arranged to form a tubular core utilizing collars of comparatively high concentration at the ends of each element, gradually decreasing in concentration toward the center of the element.

References Cited in the file of this patent

UNITED STATES PATENTS

| | | |
|---|---|---|
| 2,729,559 | Matsukawa | Jan. 3, 1956 |
| 2,743,226 | Newson | Apr. 24, 1956 |
| 2,798,810 | Goetzel et al. | July 9, 1957 |
| 2,798,848 | Kingdon | July 9, 1957 |
| 2,805,473 | Handwerk et al. | Sept. 10, 1957 |
| 2,806,820 | Wigner | Sept. 17, 1957 |
| 2,813,070 | Fermi et al. | Nov. 12, 1957 |
| 2,813,073 | Saller et al. | Nov. 12, 1957 |
| 2,820,751 | Saller | Jan. 21, 1958 |
| 2,832,733 | Szilard | Apr. 29, 1958 |

FOREIGN PATENTS

| | | |
|---|---|---|
| 648,293 | Great Britain | Jan. 3, 1951 |

OTHER REFERENCES

Nucleonic, vol. 14, No. 9, September 1956, p. 177.

TID–7529, Part 1 "Reactor Heat Transfer Conference of 1956," held in Nov. 1–2, 1956, pp. 248–261.

Progress in Nuclear Energy, Series V, Metal and Fuels, vol. 1, 1956, pp. 523–534, article by Weber and Hursch.

AEC Document, AECD–3715, Feb. 1, 1954, in particular page 11.